(12) United States Patent
Kidprasert

(10) Patent No.: US 7,461,828 B2
(45) Date of Patent: Dec. 9, 2008

(54) CHECK VALVE

(75) Inventor: Jakaphan Kidprasert, Bangkok (TH)

(73) Assignee: SCG Co., Ltd., Patumtani (TH)

( * ) Notice: Subject to any disclaimer, the term of this patent is extended or adjusted under 35 U.S.C. 154(b) by 0 days.

(21) Appl. No.: 11/159,139

(22) Filed: Jun. 23, 2005

(65) Prior Publication Data

US 2006/0226387 A1 Oct. 12, 2006

(30) Foreign Application Priority Data

Apr. 11, 2005 (TH) .............................. 0503000536

(51) Int. Cl.
*F16K 51/00* (2006.01)
(52) U.S. Cl. .................. 251/149.6; 251/149.8
(58) Field of Classification Search .............. 251/149.1, 251/149.4, 149.6, 149.8
See application file for complete search history.

(56) References Cited

U.S. PATENT DOCUMENTS

| | | | | |
|---|---|---|---|---|
| 2,265,267 A * | 12/1941 | Cowles | ..................... | 251/149.6 |
| 2,322,877 A * | 6/1943 | Parker | ..................... | 251/149.6 |
| 2,459,477 A * | 1/1949 | Van Schuyver | .......... | 251/149.6 |
| 3,532,101 A * | 10/1970 | Snyder, Jr. | ................ | 251/149.7 |
| 3,538,950 A | 11/1970 | Porteners | | |
| 3,704,002 A | 11/1972 | Skarzynski et al. | | |
| 4,070,003 A * | 1/1978 | Shames et al. | ........... | 251/149.6 |
| 5,063,960 A | 11/1991 | Kremer | | |
| 5,228,647 A | 7/1993 | Ruibal Santome et al. | | |
| 5,346,177 A * | 9/1994 | Paulsen et al. | ........... | 251/149.6 |
| 5,553,638 A * | 9/1996 | Home | ...................... | 251/149.6 |
| 5,582,201 A | 12/1996 | Lee et al. | | |
| RE35,602 E * | 9/1997 | Lechner | .................... | 251/149.6 |
| 5,911,403 A | 6/1999 | deCler et al. | | |
| 6,129,334 A * | 10/2000 | Kuwabara | ................. | 251/149.6 |
| 6,330,890 B1 | 12/2001 | Ekman et al. | | |
| 6,530,394 B2 | 3/2003 | Pai et al. | | |
| 6,691,978 B1 | 2/2004 | Bartos et al. | | |
| 6,848,670 B2 | 2/2005 | Haunhorst et al. | | |
| 6,866,243 B2 | 3/2005 | Yang et al. | | |
| 6,892,999 B2 | 5/2005 | Hall et al. | | |
| 6,908,070 B2 | 6/2005 | Bartos et al. | | |
| 6,978,800 B2 | 12/2005 | deCler et al. | | |
| 2005/0082505 A1 | 4/2005 | Sepulveda et al. | | |
| 2005/0242315 A1 | 11/2005 | Lund | | |

\* cited by examiner

*Primary Examiner*—Stephen M Hepperle
*Assistant Examiner*—Andrew J Rost
(74) *Attorney, Agent, or Firm*—Muncy, Geissler, Olds & Lowe, PLLC

(57) ABSTRACT

A gas valve having a mechanism which prevents gas from flowing out. The check valve is installed at the opposite position of the safety valve, and has a supporting seat with a hollow body, the outer surface of which is threaded to hold on the gas inlet-outlet. The valve has a hollow body with the outer end being made as a shoulder, to attach closely with the inside of the supporting seat. At the inner end of the supporting seat is a piston that is preformed as one piece. It has one end as a hollow cylinder, and a number of holes surrounding the hollow cylindrical part to be the gas inlet-outlet of the gas valve. The other end is a circular flange larger than the hollow cylindrical part, with wings protruding to support the spring.

19 Claims, 5 Drawing Sheets

CHECK VALVE

BACKGROUND OF THE INVENTION

1. Field of the Invention

This invention relates generally to a cooking gas check valve.

2. Description of the Prior Art

Generally, a cooking gas valve has problems with gas leakage due to wear and tear between the valve surface and/or the valve seat and the valve shaft. Extended use causes the valve surface to become worn out and rough, which then causes leakage and increases gas consumption. While at present the inlet-outlet of the cooking gas valve has a mechanism to prevent gas from going out if it is not being pushed, so that it can prevent the gas from leaking from the gas cylinder. This prevention of gas flow can be made even while opening the turning handle. The gas that flows out is stopped, as there is the check valve to close the gas inlet-outlet.

SUMMARY OF THE INVENTION

A gas valve of an embodiment of the present invention has a valve body on top which functions as a turning mechanism for opening and closing the valve, thereby permitting control of the flow of gas to the gas cylinder by turning the handle. On one side of the valve body is a channel for fitting a safety valve, which functions to relieve pressure in the gas cylinder when the pressure exceeds the requirement.

On an inside surface of the valve body opposite from the channel, a check valve mechanism is fitted to prevent the exit of gas, which consists of a supporting seat. The supporting seat has a hollow body, wherein the outer surface is threaded for screwing into the channel. The outer end is formed as a shoulder, which protrudes inside the innermost end to support the packing, and a plurality of slots are cut into an outer end of the supporting seat. The front side of the supporting seat has a lock washer put inside the gas inlet-outlet.

The packing has a hollow cylindrical shape, the inner end of which protrudes inwardly to attach to an outer end of the valve body. The valve has a hollow body with an outer end forming a shoulder to attach closely inside the seat. At the end of the front of the valve body is a circular edge for receiving the protruding part of the packing. The other end of the valve body has an o-ring around it. The innermost part of the supporting seat receives a piston with one end being cylindrically hollow, and having a number of holes surrounding the hollow cylinder for the gas to flow in and out of the cooking gas valve. At the other end is a circular flange bigger than the hollow cylinder with a number of wings protruding to support the spring. The seam between the hollow cylinder and the end has packing to support and prevent gas leakage between the valve body and the piston.

The purpose of this invention is to provide an improved check valve mechanism which prevents gas from flowing out of the gas cylinder. The prevention can be made even when the turning mechanism is turned on. The gas that flows out shall flow back due to the check valve that closes the gas outlet.

Another purpose of this invention is to prevent leaks when removing the gas filling device while filling the gas, when forgetting to close the gas valve on the cylinder, or when removing the pressure-adjusting regulator while changing the gas cylinder. The present device can help the gas to stop flowing, because it has a check valve to close the gas inlet-outlet, so as to reduce danger from a gas leak.

Moreover, another intention of the present invention is to prevent leaks when there is an accident during a transport which causes the handle to open suddenly or, when there is an accidental touch of the handle and some gas flows out. The present device can help the flowing gas to stop, as there is the check valve to close the gas inlet-outlet, thus minimizing danger from a gas leak.

Further scope of the applicability of the present invention will become apparent from the detailed description given hereinafter. However, it should be understood that the detailed description and specific examples, while indicating certain embodiments of the invention, are given by way of illustration only, since various changes and modifications within the spirit and scope or the invention will become apparent to those skilled in the art from this detailed description

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
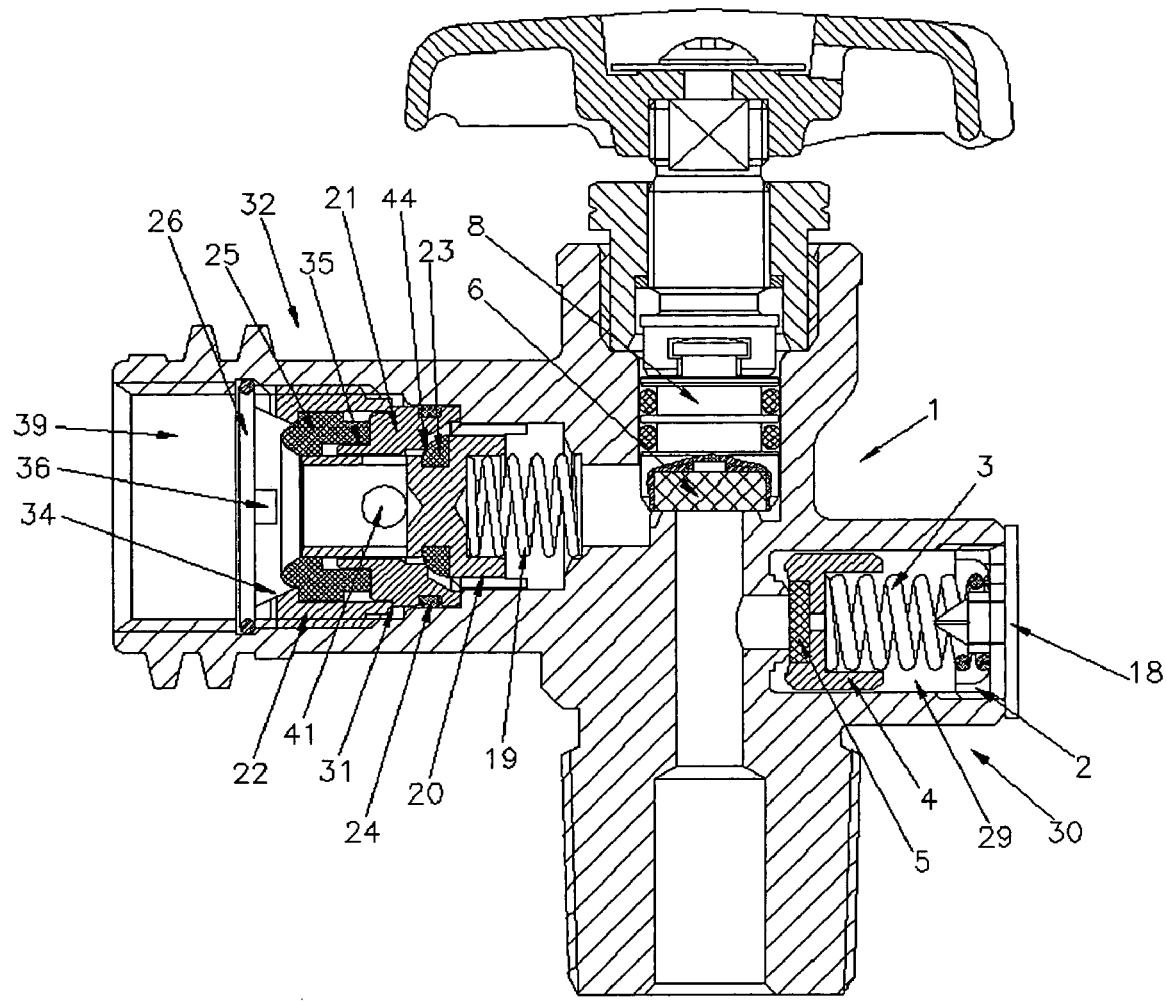
FIG. 1 is a cross-sectional view of the cooking gas valve of the present invention.
Figure 2:
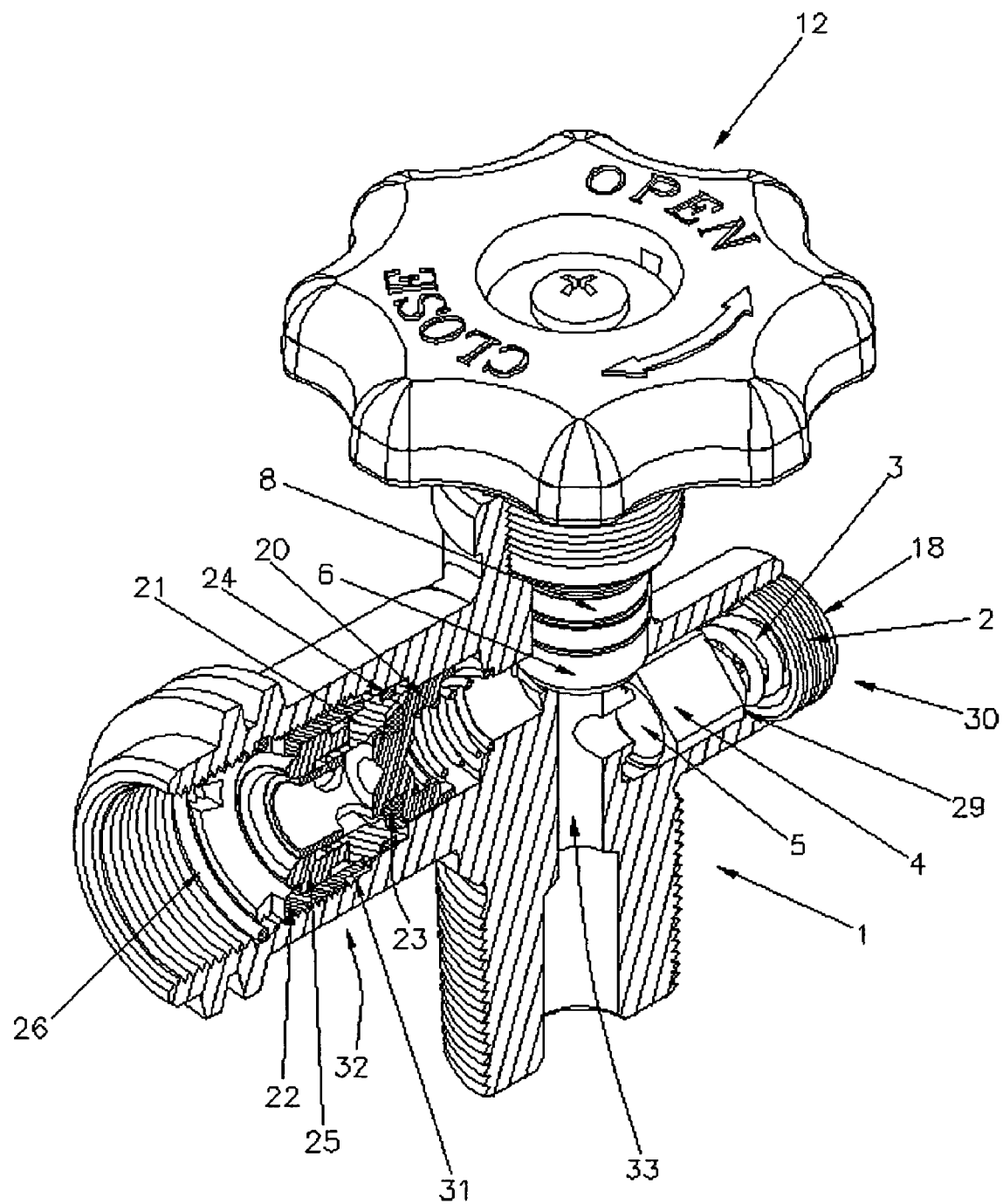
FIG. 2 is a cross-sectional perspective view of the cooking gas valve.

FIGS. 1 and 2 show a cross section of a gas valve according to one embodiment of the present invention, consisting of a valve body 1 which is preformed with the hollow body. The top of the valve body 1 is a turning mechanism (12) which can be opened and closed to control the flow of gas to the tank. Turning the handle causes the shaft (8) of the turning mechanism (12) to move up and/or down, thereby pushing the plate (6) into an opened and/or closed position, which controls the flow of the gas (33) into the gas cylinder. On one side of the valve body (1) is a channel (29), which is fitted with a safety valve (30) which functions to relieve pressure in the gas cylinder, if the pressure in the cylinder exceeds the requirement. The safety valve (30) has a threaded inner surface, which holds the safety valve against the closer (2), thereby helping to prevent the safety valve (30) from being loosened out of the gas valve.

On the outer surface of the closer (2) is a rubber plate (18) to close the gas outlet. inside the safety valve (30) is a pushing rod (4) with a pushing plate (5) fitted to the mouth of the gas-relieved channel. The pushing rod (4) sends force via the spring (3), in order to push the rubber plate (18) out when pressure in the gas cylinder exceeds the requirement. The turning mechanism (12) and the safety valve (30) that exist in the gas valve are widely used.

On an inner position opposite the channel (29) is a channel (31) for installing the check valve (32), consisting of a supporting seat (22) having a hollow body with a threaded outer surface for holding onto the channel (31). The outer end is the shoulder (34) that protrudes into the inner end to support the packing (25) fitted inside the supporting seat (22). The outer end of the supporting seat (22) has a number of channels (36) around in the opposite position. The front area of the supporting seat (22) has a lock washer (26) put inside the surface of the gas inlet-outlet (39) to hold down the check valve (32) and prevent it from coming loose at the gas inlet-outlet (39).

The packing (25) has a hollow cylinder at the inner end which protrudes (35). The surrounding part (25) of the packing attaches to the front of the valve body (21) The packing (25) prevents gas leakage between the supporting seat (22) and the valve body (21).

The valve body (21) is put on the supporting seat (22), and has a hollow body and an outer end made to be a shoulder (37) to attach inside the supporting seat (22). At the front end of the valve body (21) is a round edge (38) for putting into the protruded part (35) of the packing (25). The other end of the valve body (21) has an o-ring (24) worn around it, in order to prevent gas leakage between the inner surface of the gas inlet-outlet (39) and the valve body (21).

The innermost end of the supporting seat (22) is put on the piston (20), which is preformed as one piece with one end being the hollow cylinder (40). It has a number of holes (41) surrounding the outer part of the hollow cylinder (40) for the gas to flow into and/or out of the cooking gas valve. The other end (42) is a flange larger than the hollow cylinder (40), which has a number of wing (43) protruding from the end (42) of the piston (20) to support the spring (19). The seam between the hollow cylinder (40) and the end (42) has supporting packing (23) to prevent gas leakage between the valve body (21) and the piston (20).

Figure 3:
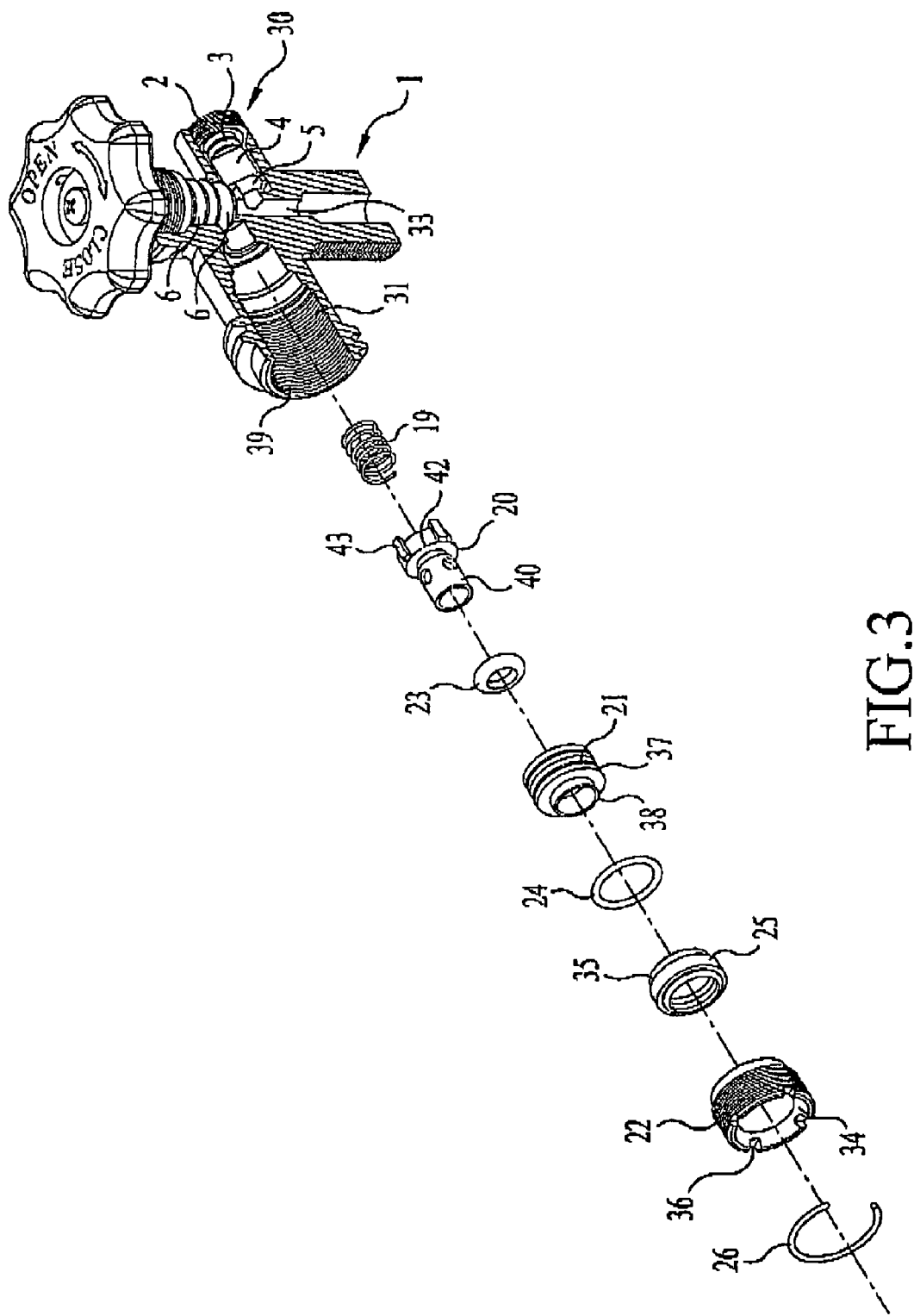
FIG. 3 is an exploded view of the check valve mounted within the cooking gas valve.

FIG. 3 shows each component of the check valve of the cooking valve of the invention. On the top part of the valve body (1) is the turning mechanism (12) used for opening and/or closing the gas that flows to the gas cylinder, by turning the handle. On one side of the valve body (1) is the channel (29) for fitting the safety valve (30) that relieves pressure in the gas cylinder when it exceeds the requirement.

Opposite the channel (29) is the channel (31) for fitting the check valve (32), including the supporting seat (22). The supporting seat (22) has a hollow body with a threaded outer surface for holding onto the channel (31). At the outer end is a shoulder (34) that protrudes to the end to support the packing (25). At the outer end of the supporting seat (22) is a number of channels (36) surrounding the opposite position. At the front end of the supporting seat (22) is a lock washer (26), put inside the surface of the gas inlet-outlet.

The packing (25) has a hollow cylinder, with the inner end (35) protruding out around the packing (25). It attaches to the front end of the valve body (21), so that the packing (25) prevents gas leakage between the supporting seat (22) and the valve body (21). The valve body (21) has a hollow body with an outer end made to be the shoulder (37), to attach with the inside of the supporting seat (22). At the end of the front valve body (21) is a circular edge (38) for receiving the protruded part (35) of the packing (25). The other end of the valve body (21) has an o-ring (24) around it At the innermost end of the supporting seat (22) is the piston (20), which is preformed in one piece. On one end is a hollow cylinder (40), which has a number of holes (41) on it. The surrounding part that is a hollow cylinder (40) is used to flow gas in-out of the cooking gas valve. The other end (42) is a circular flange, larger than the hollow cylinder (40), with a number of wings (43) protruding from the end (42) of the piston (20) to support the spring (19). The seam between the hollow cylinder (40) and the end part (42) has supporting packing (23), in order to prevent gas leakage between the valve body (21) and the piston (20).

Figure 4:
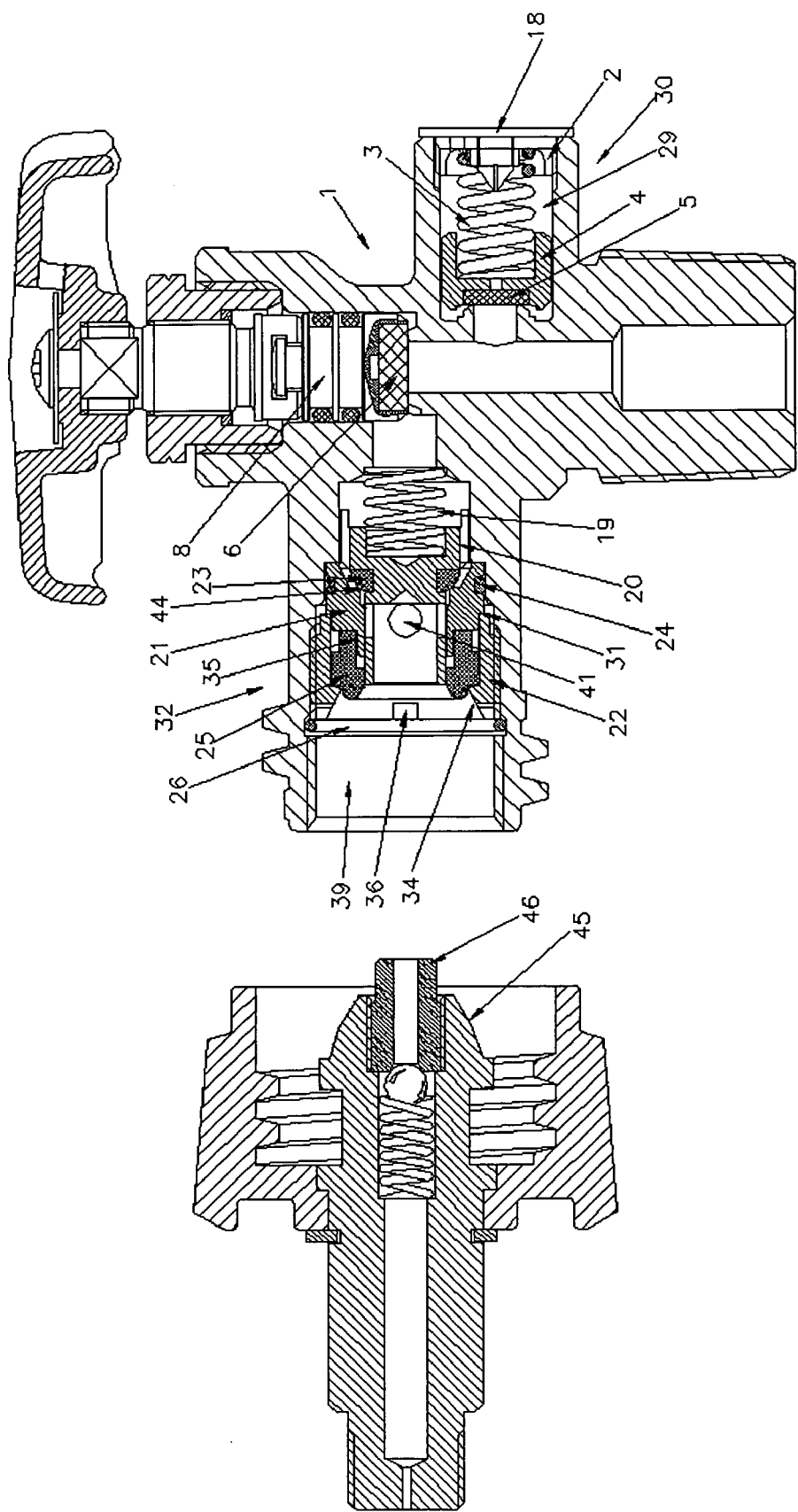
FIG. 4 is a cross-sectional view of a typical bull-nose coupling before it is coupled onto the outlet of the valve body through the ACME outlet's square thread.
Figure 5:
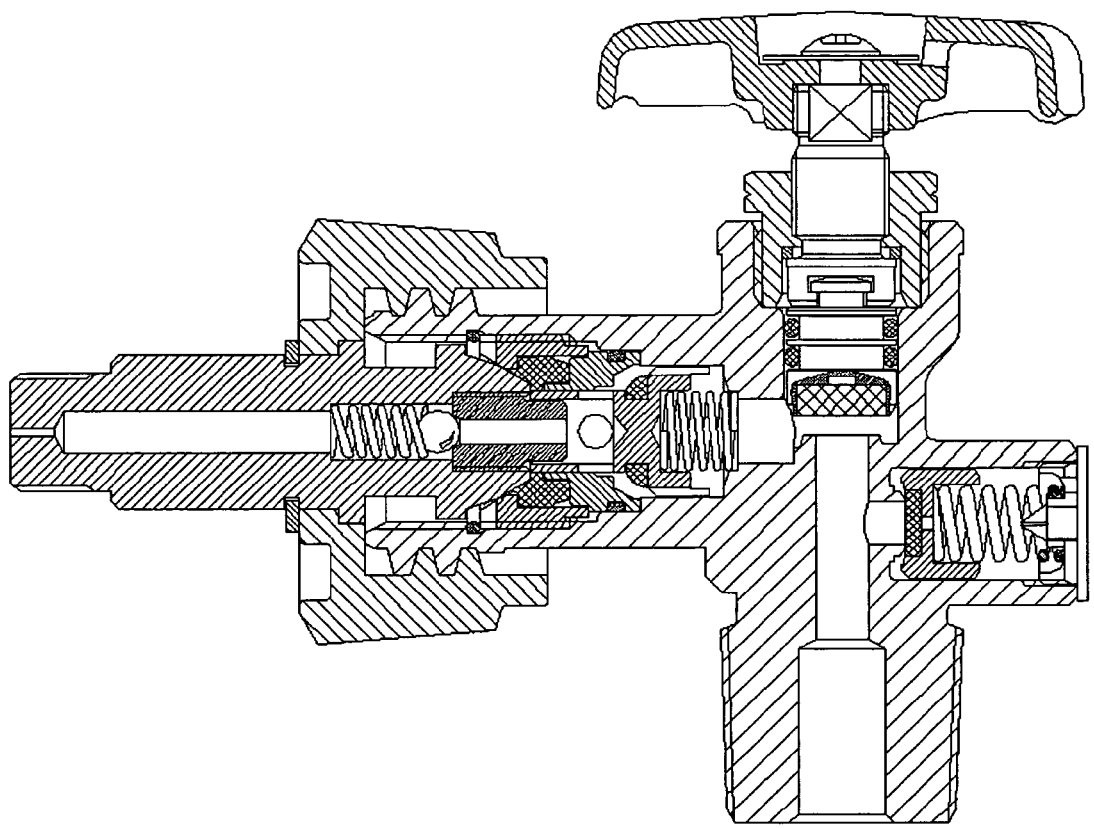
FIG. 5 is a cross-sectional view of a tip of the bull-nose which pushes the piston backward so that gas can flow through the valve.

FIG. 4 and FIG. 5 show how a typical bull-nose coupling (46) is pushed against the piston (20) and coupled onto the valve body so that gas flows freely and is leak free, looking from outside of the coupling. The bull-nose (45) is pushed against the packing (25) so leak tightness is made possible FIG. 4 and FIG. 5 show how a typical bull-nose coupling (46) is pushed against the piston (20) and coupled onto the valve body so that gas flows freely and is leak free, looking from outside of the coupling. The bull-nose (45) is pushed against the packing (25) so leak tightness is made possible The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A check valve mounted in a channel of an outlet of a gas valve, comprising:
    a seat having a hollow body insertable into said channel, wherein the seat has an outer end defining a plurality of open, unobstructed slots;
    a valve body, separate from said seat, having at least a portion mounted radially within the seat, said valve body having a radially tapered inner end and an axially extending outer round edge;
    an outer packing contacting said seat and said valve body wherein the outer packing has a hollow cylindrical body with a packing inner end which protrudes inwardly to abut an outer end of said valve body and radially surrounding said round edge, and a packing outer end which is deformable so as to form a seal;
    a movable piston extending through said valve body wherein said movable piston defines a plurality of holes which allow gas to flow when said movable piston is pushed inwardly;
    a plurality of leg wings extending from a flange formed on an inner end of said movable piston which allow gas to flow when said movable piston is pushed inwardly;
    a spring contacting the inner end of said movable piston, urging said movable piston in an outward direction; and
    an inner packing mounted on said movable piston extending radially to an outer edge of said leg wings and contacting said valve body so as to prevent a flow of gas when said movable piston is not pushed inwardly;
    wherein the valve body outer end has a shoulder which abuts an inside surface of said seat.

2. The check valve according to claim 1, wherein said inner packing is mounted between a hollow cylinder portion of said movable piston and the inner end of said piston.

3. The check valve according to claim 1, wherein the channel has a threaded inner channel surface and wherein the seat has a threaded outer surface for engaging the channel threaded inner surface.

4. The check valve according to claim 1, wherein the outer packing is made of rubber.

5. The check valve according to claim 1, wherein the outer packing has a bulbous tip extending from the seat.

6. The check valve according to claim 1, wherein the check valve is further for use with a removable conduit adapted for coupling with the gas valve outlet, wherein the outer packing has a rounded tip extending from the seat, the rounded tip being spaced from and free of contact with the seat when the removable conduit is not coupled to the gas valve outlet.

7. The check valve according to claim 1, wherein the outer packing has a protruding, annular tip having a C-shaped cross section.

8. The check valve according to claim 1, wherein the gas valve is a cooking gas valve.

9. The check valve according to claim 1, wherein the outlet channel has an outer end, the gas valve further comprising a lock washer mounted on the outer end of the outlet channel to prevent the seat from moving out of the outlet end of the outlet channel.

10. The check valve according to claim 1, wherein the spring has a uniform diameter along a length thereof.

11. The check valve according to claim 1, wherein the spring is cylindrically shaped.

12. The check valve according to claim 1, wherein the plurality of slots in the outer end of the seat are on an outwardly facing end of the seat.

13. The check valve according to claim 1, wherein the plurality of slots in the outer end of the seat are at an outermost part of the end of the seat.

14. The check valve according to claim 1, wherein the valve body has a valve body outer end, the check valve further comprising an O-ring mounted on the valve body outer end.

15. The check valve according to claim 1, wherein the valve body tapered inner end abuts the inner packing when the movable piston is not pushed inwardly.

16. The check valve according to claim 15, wherein the tapered inner end has a projection contacting said inner packing.

17. The check valve according to claim 1, wherein the spring is at an opposite end of the valve body from the shoulder of the valve body.

18. The check valve according to claim 1, wherein the seat extends along only a portion of the valve body.

19. The check valve according to claim 1, wherein the spring is at an upstream end of the movable piston.

\* \* \* \* \*